(12) United States Patent
Oono

(10) Patent No.: US 8,539,600 B2
(45) Date of Patent: Sep. 17, 2013

(54) DATA PROCESSING SYSTEM, AND DATA PROCESSING APPARATUS AND USER TERMINAL EQUIPMENT THEREFOR, AND COMPUTER-READABLE STORAGE MEDIUM AND DATA PROCESSING METHOD THEREOF

(75) Inventor: Takeo Oono, Tokyo (JP)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 13/062,448

(22) PCT Filed: Oct. 28, 2009

(86) PCT No.: PCT/JP2009/005690
§ 371 (c)(1),
(2), (4) Date: Mar. 4, 2011

(87) PCT Pub. No.: WO2010/050195
PCT Pub. Date: May 6, 2010

(65) Prior Publication Data
US 2011/0179496 A1   Jul. 21, 2011

(30) Foreign Application Priority Data

Oct. 31, 2008  (JP) .................................. 2008-280749

(51) Int. Cl.
*G06F 7/04* (2006.01)
(52) U.S. Cl.
USPC .......................................................... 726/26

(58) Field of Classification Search
USPC .......................................................... 726/26
See application file for complete search history.

(56) References Cited

U.S. PATENT DOCUMENTS

2007/0264974 A1* 11/2007 Frank et al. .................. 455/411

FOREIGN PATENT DOCUMENTS

| JP | 2002314477 A | 10/2002 |
| JP | 2004032367 A | 1/2004 |
| JP | 2006254294 A | 9/2006 |

OTHER PUBLICATIONS

International Search Report for PCT/JP2009/005690 mailed Jan. 26, 2010.

* cited by examiner

*Primary Examiner* — Jacob Lipman

(57) ABSTRACT

User activity data to be provided to a predetermined data service system is generated reflecting a current status of a general user, and the generated current user activity data is acquired. The current user activity data is stored and then provided to the data service system. Here, it is judged whether to keep the to-be-provided current user activity data confidential, in accordance with a predetermined condition. Upon judgment to keep the current user activity data confidential, pseudo activity data different from but not contradictory with the current user activity data to be stored is generated from the stored past user activity data. The generated pseudo activity data is added to the current user activity data to be stored. Thus, a data processing system is provided that allows the user activity data of the general user to be kept confidential if necessary, for protection of privacy.

13 Claims, 22 Drawing Sheets

FIG. 8

| STATUS | REAL VALUE | PSEUDO VALUE |
|---|---|---|
| RETURN REAL VALUE | A−B | ← |
| RETURN PSEUDO VALUE | B−C−E | B−D−E |
| RETURN REAL VALUE | E−F | ← |

FIG. 10

| STATUS | REAL VALUE | PSEUDO VALUE |
|---|---|---|
| RETURN REAL VALUE | A—B | ← |
| RETURN PSEUDO VALUE | B—C | B—D—E |
| RETURN PSEUDO VALUE | C—F | Null |
| RETURN REAL VALUE | E—G | ← |

FIG. 12

| STATUS | REAL VALUE | PSEUDO VALUE |
|---|---|---|
| RETURN REAL VALUE | A—B | ← |
| RETURN PSEUDO VALUE | B—C—E | B—D |
| RETURN PSEUDO VALUE | E—G | Null |
| RETURN REAL VALUE | G—F | ← |

FIG. 14

| STATUS | REAL VALUE | PSEUDO VALUE |
|---|---|---|
| RETURN REAL VALUE | A−B | ← |
| RETURN PSEUDO VALUE | B−C | B−D |
| RETURN PSEUDO VALUE | C−H | Null |
| RETURN REAL VALUE | H−J | ← |

FIG. 16

| STATUS | REAL VALUE | PSEUDO VALUE |
|---|---|---|
| RETURN REAL VALUE | A—B | ← |
| RETURN PSEUDO VALUE ↓ (CHANGED) RETURN REAL VALUE | B—C | B—D ↓ (MODIFIED) B—C |
| RETURN REAL VALUE | C—E | ← |
| RETURN REAL VALUE | E—F | ← |

DATA PROCESSING SYSTEM, AND DATA PROCESSING APPARATUS AND USER TERMINAL EQUIPMENT THEREFOR, AND COMPUTER-READABLE STORAGE MEDIUM AND DATA PROCESSING METHOD THEREOF

TECHNICAL FIELD

The present invention relates to a data processing system that provides user activity data reflecting a current status of general users to a predetermined data service system, a data processing apparatus and a user terminal equipment for such a system, and to a computer program and a data processing method thereof.

BACKGROUND ART

Recently, various services that utilize position information have been developed, such as a security service capable of checking present positions and action histories of seniors and young people using position information.

Also, such services have been launched that provide information more specifically related to activities and inclinations of the owner of the mobile phone, utilizing for example a view history of web browsers, in addition to the position information.

However, the provision of the position information and user activity data such as the web view history by the general user to a service leads to a risk that the privacy of the general user may endlessly leak to operators of the service provider and information users who utilize the user activity data from the service.

Refraining from providing with the user activity data is the simplest way that the general user could keep his/her highly private activity confidential, however in this case other users can notice the fact that the general user is performing an activity that is so private that he or she needs to keep a secret. Accordingly, it is requires such measures that other users can not recognize that the general user is not providing the user activity data.

To cope with the foregoing problem, user activity data conceal systems have been proposed. For example, a technique has been proposed that returns pseudo positioning information designated by the general user in advance with a place name or the like, in response to a reference of position information from a specific service (for example, patent document 1).

Also, a technique has been proposed that returns a pseudo route calculated on the basis of the current position of the general user and the designated destination, in response to a reference of position information from a specific service, thereby concealing information with reduced contradiction in information between before and after the concealing (for example, patent document 2).

RELATED DOCUMENT

Patent Document

[Patent document 1] Japanese Laid-Open Patent Publication No. 2004-032367
[Patent document 2] Japanese Laid-Open Patent Publication No. 2006-254294

SUMMARY OF THE INVENTION

The foregoing conventional techniques are, however, not always capable of generating pseudo data that does not contradict with daily activities of the general user. Besides, the information that can be kept confidential is limited to the position information.

The present invention has been made in view of the above-mentioned problems, and provides a data processing system that may keep user activity data of a general user as necessary, and protect privacy of the general user, a data processing apparatus and a user terminal equipment of such a system, and a computer program and a data processing method of the apparatus and the equipment.

A data processing system according to the present invention includes a data generation unit that generates user activity data to be provided to a predetermined data service system, reflecting a current status of a general user; a data acquisition unit that acquires the generated current user activity data; a data storage unit that stores the acquired current user activity data; a data provision unit that provides the stored current user activity data to the data service system; a condition judging unit that judges whether to keep the to-be-provided current user activity data confidential, in accordance with a predetermined condition; a pseudo data generation unit that generates, in the case where the current user activity data is judged to be kept confidential, pseudo activity data different from but not contradictory with the current user activity data to be stored, on the basis of stored past user activity data; and a data hiding unit that adds the generated pseudo activity data to the current user activity data to be stored.

A data processing apparatus, according to the present invention, to be used in the data processing system according to the present invention together with the data generation unit and the data service system, includes a data acquisition unit that acquires current user activity data generated by the data generation unit; a data storage unit that stores the acquired current user activity data; a data provision unit that provides the stored current user activity data to the data service system; a condition judging unit that judges whether to keep the to-be-provided current user activity data confidential, in accordance with a predetermined condition; a pseudo data generation unit that generates, in the case where the current user activity data is judged to be kept confidential, pseudo activity data different from but not contradictory with the current user activity data to be stored, on the basis of stored past user activity data; and a data hiding unit that adds the generated pseudo activity data to the current user activity data to be stored.

A user terminal equipment, according to the present invention, to be used in the data processing system according to the present invention together with the data service system, includes a data generation unit that generates user activity data to be provided to a predetermined data service system, reflecting a current status of a general user; a data acquisition unit that acquires the generated current user activity data; a data storage unit that stores the acquired current user activity data; a data provision unit that provides the stored current user activity data to the data service system; a condition judging unit that judges whether to keep the to-be-provided current user activity data confidential, in accordance with a predetermined condition; a pseudo data generation unit that generates, in the case where the current user activity data is judged to be kept confidential, pseudo activity data different from but not contradictory with the current user activity data to be stored, on the stored basis of past user activity data; and a data hiding unit that adds the generated pseudo activity data to the current user activity data to be stored.

A first computer program according to the present invention of the data processing apparatus according to the present invention, causes the data processing apparatus to execute: a data acquisition process that acquires current user activity data generated by the data generation unit; a data storage process that stores the acquired current user activity data; a data provision process that provides the stored current user activity data to the data service system; a condition judging process that judges whether to keep the to-be-provided current user activity data confidential, in accordance with a predetermined condition; a pseudo data generation process that generates, in the case where the current user activity data is judged to be kept confidential, pseudo activity data different from but not contradictory with the current user activity data to be stored, on the basis of stored past user activity data; and a data hiding process that adds the generated pseudo activity data to the current user activity data to be stored.

A second computer program according to the present invention of the user terminal equipment according to the present invention, causes the user terminal equipment to execute: a data generation process that generates user activity data to be provided to a predetermined data service system, reflecting a current status of a general user; a data acquisition process that acquires the generated current user activity data; a data storage process that stores the acquired current user activity data; a data provision process that provides the stored current user activity data to the data service system; a condition judging process that judges whether to keep the to-be-provided current user activity data confidential, in accordance with a predetermined condition; a pseudo data generation process that generates, in the case where the current user activity data is judged to be kept confidential, pseudo activity data different from but not contradictory with the current user activity data to be stored, on the basis of stored past user activity data; and a data hiding process that adds the generated pseudo activity data to the current user activity data to be stored.

A first data processing method according to the present invention in the data processing apparatus according to the present invention, includes: a data acquisition operation that acquires current user activity data generated by the data generation unit; a data storage operation that stores the acquired current user activity data; a data provision operation that provides the stored current user activity data to the data service system; a condition judging operation that judges whether to keep the to-be-provided current user activity data confidential, in accordance with a predetermined condition; a pseudo data generation operation that generates, in the case where the current user activity data is judged to be kept confidential, pseudo activity data different from but not contradictory with the current user activity data to be stored, on the basis of stored past user activity data; and a data hiding operation that adds the generated pseudo activity data to the current user activity data to be stored.

A second data processing method according to the present invention in the user terminal equipment according to the present invention, includes: a data generation operation that generates user activity data to be provided to a predetermined data service system, reflecting a current status of a general user; a data acquisition operation that acquires the generated current user activity data; a data storage operation that stores the acquired current user activity data; a data provision operation that provides the stored current user activity data to the data service system; a condition judging operation that judges whether to keep the to-be-provided current user activity data, in accordance with a predetermined condition; a pseudo data generation operation that generates, in the case where the current user activity data is judges to be kept confidential, pseudo activity data different from but not contradictory with the current user activity data to be stored, on the basis of stored past user activity data; and a data hiding operation that adds the generated pseudo activity data to the current user activity data to be stored.

It is to be noted that a form of each constituent of the present invention is not limited as long as it is capable of performing the intended function, and may be realized as, for example, an exclusive hardware that performs a predetermined function, a data processor in which a predetermined function is incorporated by a computer program, a predetermined function realized in a data processor by a computer program, and an optional combination thereof.

Also, the constituents of the present invention do not necessarily have to be individually independent, but may be configured such that a plurality of constituents constitutes a single member, a constituent is formed by a plurality of members, a constituent is a part of another constituent, a part of a constituent and a part of another constituent overlap, and so forth.

Although processes and operations may be sequentially stated in the description of a computer program and a data processing method according to the present invention, such sequence does not necessarily limit the order in practically executing those processes and those operations.

Accordingly, the sequence of the processes and the operations may be modified when executing the data processing method according to the present invention, unless inconvenience is incurred.

The processes and the operations of the computer program and the data processing method according to the present invention are not limited to be executed at different timings. Therefore, a process and an operation may be generated during the execution of another process and another operation. The execution timing of a process and an operation may partially or entirely overlap that of another.

Further, the data processing apparatus and the user terminal equipment according to the present invention may be constituted of hardware configured with general-use devices such as a central processing unit (CPU), a read-only memory (ROM), a random access memory (RAM), and an interface (I/F) unit, a dedicated logic circuit designed so as to perform a predetermined process, and a combination of those mentioned above, for reading the computer program and execute the process accordingly.

Further, causing the data processing apparatus and the user terminal equipment to perform various actions associated with the computer program according to the present invention includes causing the data processing apparatus to control actions of the devices.

For example, storing various data in the data processing apparatus encompasses actions by the CPU for storing the data in an information storage medium such as a hard disk drive (HDD) installed in the data processing apparatus, for storing the data in an information storage medium such as a compact disc-recordable (CD-R) replaceably mounted on the data processing apparatus, and so forth.

In the data processing system according to the present invention, the data generation unit generates the user activity data to be provided to a predetermined data service system, reflecting the current status of the general user, and the data acquisition unit acquires the generated current user activity data. The data storage unit stores the acquired current user activity data, and the data provision unit provides the stored current user activity data to the data service system. Here, the condition judging unit judges whether to keep the to-be-provided current user activity data confidential, in accordance with a predetermined condition. Then the pseudo data generation unit generates, in the case where the current user activity data is judged to be kept confidential, the pseudo activity data different from but not contradictory with the current user activity data to be stored, on the basis of stored past user activity data. The data hiding unit adds the generated pseudo activity data to the current user activity data to be stored. Accordingly, the current user activity data of the general user to be provided to the data service system is partially replaced with the pseudo activity data, for example by designation of the general user or by automatic decision of the system. Thus, the user activity data of the general user can be kept confidential in the case of need, so that his/her privacy can be protected. In particular, since the pseudo activity data for hiding the user activity data is generated from the stored past user activity data, it may prevent from arising question by keeping the user activity data confidential using unnatural pseudo activity data.

BRIEF DESCRIPTION OF THE DRAWINGS

The above and other objects, features and advantages of the present invention will become more apparent through preferred exemplary embodiments described hereunder referring to the accompanying drawings.

FIG. 8 is a table illustrating a structure of the user activity data;

FIG. 10 is a table illustrating a structure of the user activity data;

FIG. 12 is a table illustrating a structure of the user activity data;

FIG. 14 is a table illustrating a structure of the user activity data;

FIG. 16 is a table illustrating a structure of the user activity data;

DESCRIPTION OF EMBODIMENTS

Figure 1:
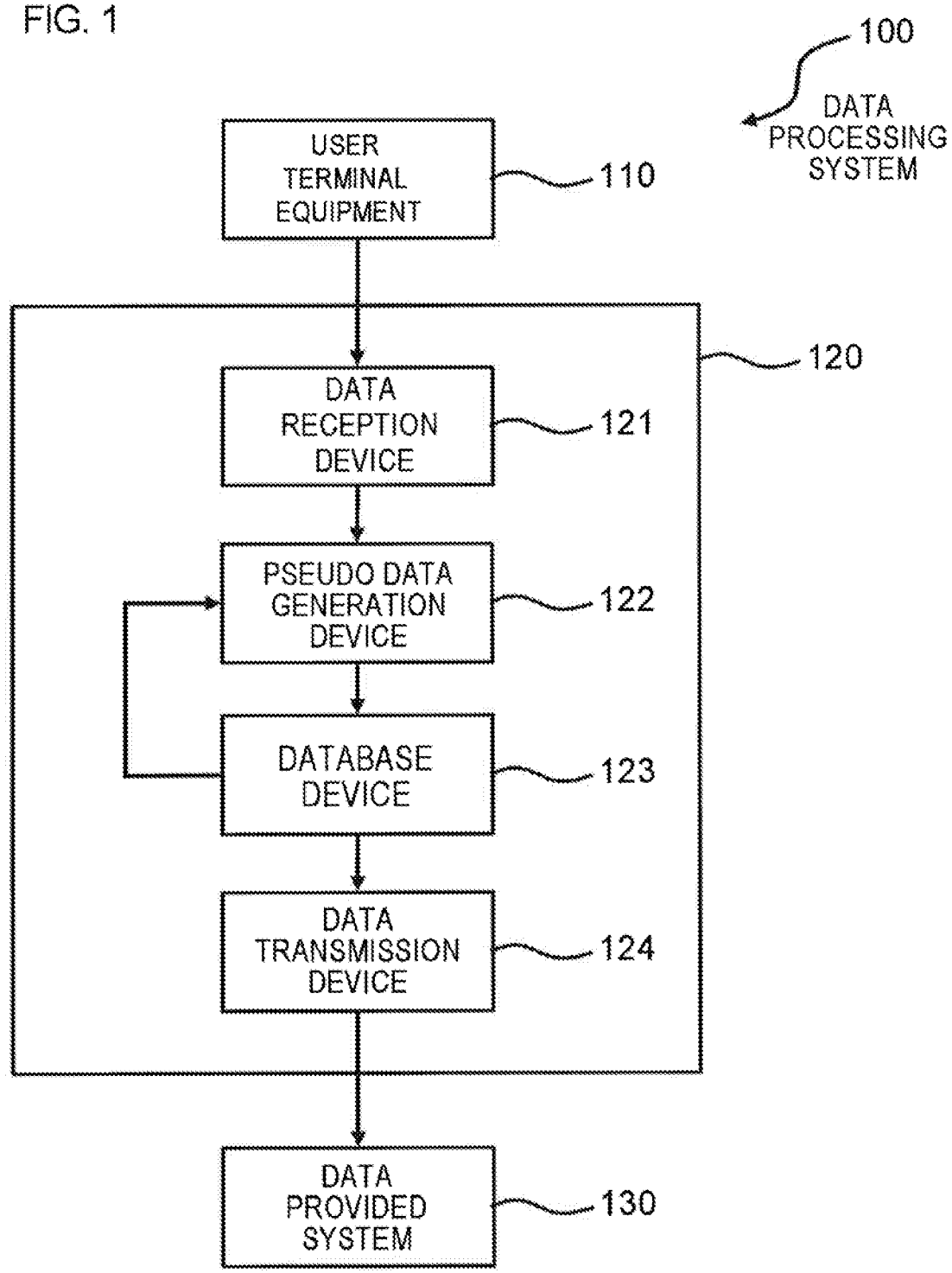
FIG. 1 is a block diagram illustrating a logical configuration of a data processing system according to an exemplary embodiment of the present invention.

A first exemplary embodiment of the present invention will be described hereunder, referring to the drawings. A data processing system 100 according to this exemplary embodiment includes, as illustrated in FIGS. 1 to 3, a user terminal equipment 11, a data processing apparatus 120, and a data provided system 130.

The user terminal equipment 110 is for example a mobile phone terminal or a personal computer, and generates user activity data of a general user (not illustrated). The data provided system 130 includes, for example, a server system of a wireless provider with whom the general user makes a contract, and serves to record the user activity data under the contract.

Figure 2:
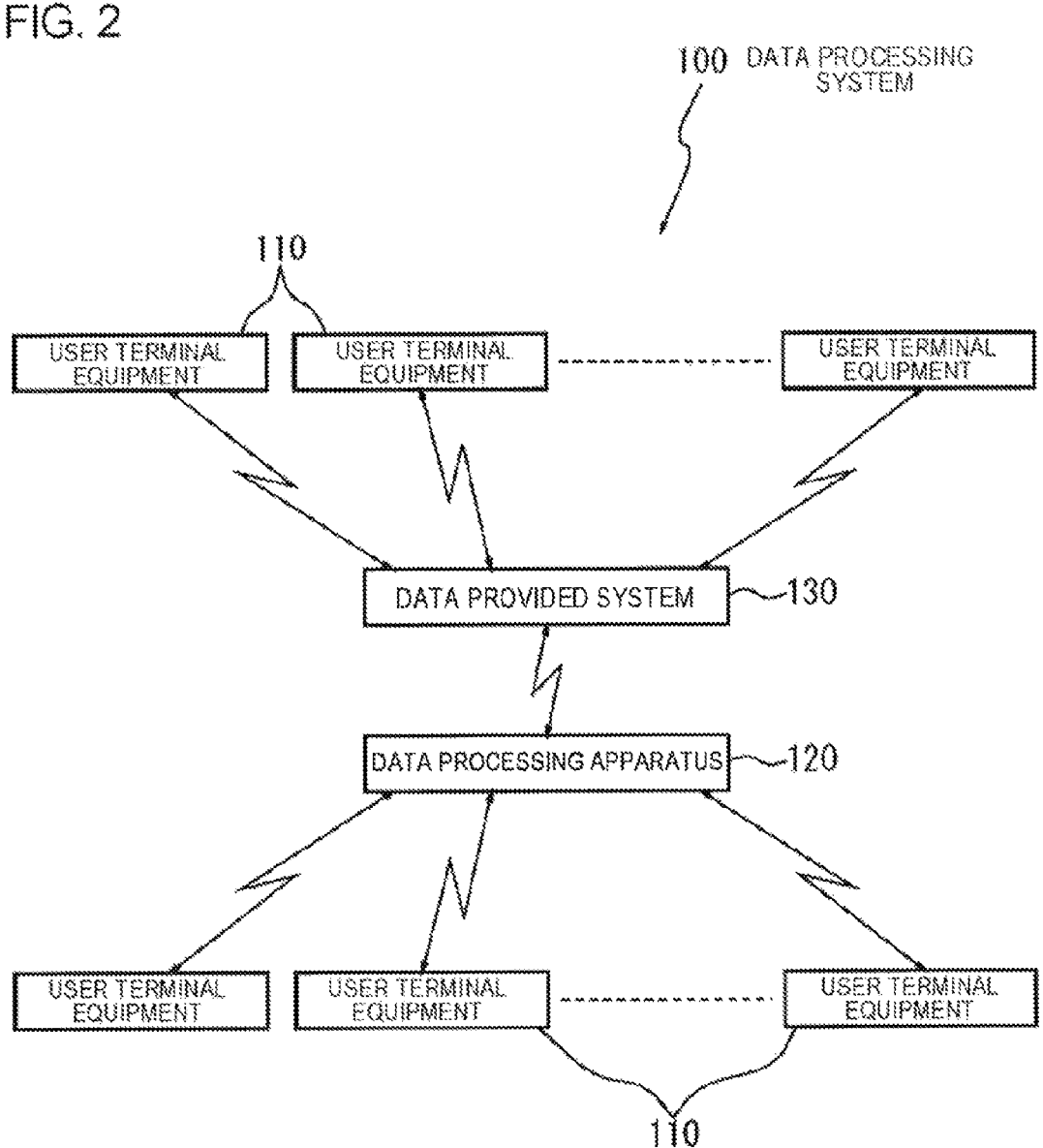
FIG. 2 is a block diagram illustrating a more detailed logical configuration of the data processing system.
Figure 3:
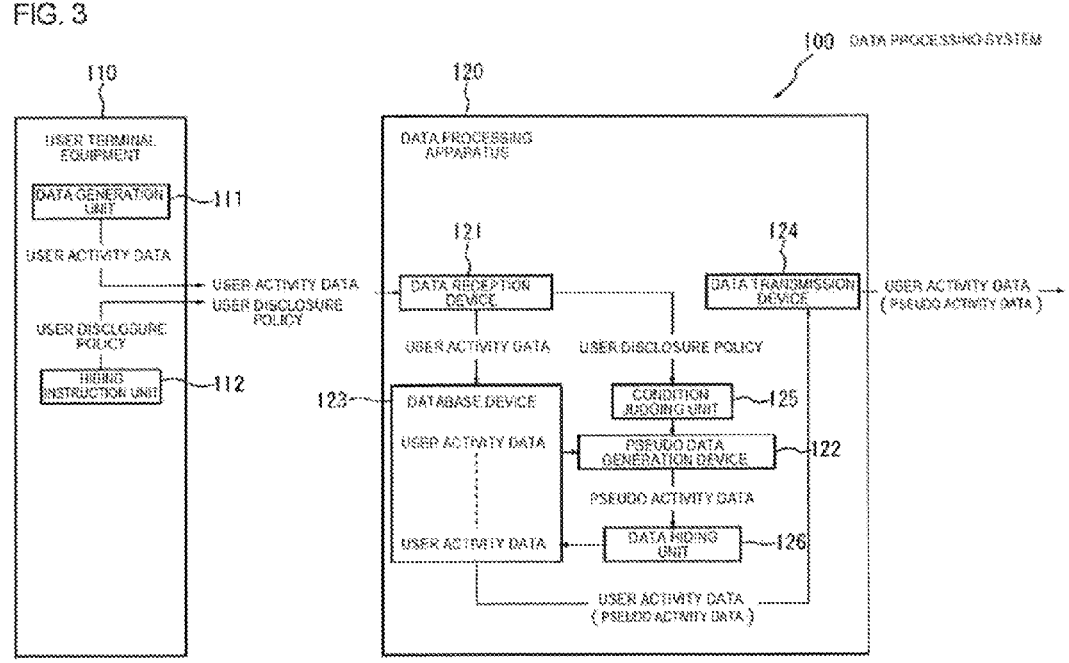
FIG. 3 is a block diagram illustrating a physical configuration of the data processing system.

Accordingly, a number of user terminal equipments 110 are connected to the data provided system 130 by wired or wireless, as illustrated in FIG. 2. Here, in the data processing system 100 according to this exemplary embodiment, at least a part of the user terminal equipments 110 is connected to the data provided system 130 through the data processing apparatus 120.

The data processing apparatus 120 includes, for example, a computer apparatus having a communication unit of a predetermined provider, a computer unit, a storage device and so on, and provides a service of keeping the user activity data recorded in the data provided system 130 confidential, under a contract.

The data processing apparatus 120 includes, for example, a data reception device 121, a pseudo data generation device 122, a database device 123, and a data transmission device 124 as illustrated in FIG. 1, which are realized by making various hardware function in correspondence with a computer program installed in the computer unit.

Likewise, the user terminal equipment 110 is also configured as a computer apparatus, and includes, for example, a data generation unit 111 and a hiding instruction unit 112 as illustrated in FIG. 3, which are realized by making various hardware function in correspondence with a computer program installed in the computer unit.

The data generation unit 111 generates the user activity data reflecting a current status of the general user, to be provided to the data provided system 130, exemplifying the predetermined data service system. For example, in the case where the user terminal equipment 110 is what is known as a GPS mobile phone, movement track data thereof is generated by a GPS unit (not illustrated) as the user activity data.

The hiding instruction unit 112 allows the general user to designate a user disclosure policy that instructs whether to keep the user activity data confidential, when the user activity data is generated as described above. This corresponds to a function of the computer unit, of recognizing a predetermined operation of a keyboard of the user terminal equipment 110 such as the GPS mobile phone.

To be more specific, the data processing apparatus 120 serving to intervene between the user terminal equipment 110 and the data provided system 130 includes, as illustrated in FIG. 3, a data reception device 121, corresponding to the data acquisition unit, that acquires the generated current user activity data, a database device 123, corresponding to the data storage unit, that stores the acquired current user activity data, a data transmission device 124, corresponding to the data provision unit, that provides the stored current user activity data to the data provided system 130, a condition judging unit 125 that decides whether to keep the provided current user activity data confidential, in accordance with a predetermined condition, a pseudo data generation device 122, corresponding to the pseudo generation unit, that generates, in the case where the current user activity data is judged to be kept confidential, pseudo activity data different from but not contradictory with the current user activity data to be stored, and a data hiding unit 126 that adds the generated pseudo activity data to the current user activity data to be stored.

Here, the data reception device 121 acquires the user disclosure policy designated in the user terminal equipment 110 as described above, together with the user activity data, so that the condition judging unit 125 decides whether to keep the current user activity data confidential, in accordance with the acquired user disclosure policy. The pseudo data generation device 122 selects one similar to the current user activity data, out of a plurality of stored past user activity data, and generates the pseudo activity data.

Further, the data transmission device 124 may stop transmitting the pseudo activity data in the case where the pseudo activity data being transmitted at real time matches the current user activity data not being transmitted, and restart transmitting the current user activity data, as will be subsequently described in further detail. The condition judging unit 125 may cause the current user activity data to be provided to the data provided system 130 in the case where past user activity data that allows the pseudo activity data to be generated cannot be retrieved.

As stated earlier, although those units of the data processing apparatus 120 are realized by utilizing the respective hardware and by fundamentally executing the computer unit in accordance with a computer program.

Such a computer program is written so as to cause the data processing apparatus 120 to execute: a data acquisition process that acquires the current user activity data generated by the data generation unit 111 of the user terminal equipment 110; a data storage process that stores the acquired current user activity data; a data provision process that provides the stored current user activity data to the data provided system 130; a condition judging process that judges whether to keep the to-be-provided current user activity data confidential, in accordance with a predetermined condition; a pseudo data generation process that generates, in the case where the current user activity data is judged to be kept confidential, the pseudo activity data different from but not contradictory with the current user activity data to be stored, on the basis of the stored past user activity data; and a data hiding process that adds the generated pseudo activity data to the current user activity data to be stored.

An operation of the data processing system 100 according to this exemplary embodiment, executed under the foregoing configuration, will be described hereunder. First, the general user who utilizes the user terminal equipment 110 makes a contract for a service of recording the user activity data if desired, with a provider of the data provided system 130.

Upon making the contract for the service, the general user makes a contract for a service of concealing the user activity data to be recorded if desired, with a provider of the data processing, apparatus 120.

The above having been done, for example the user terminal equipment 110 generates the user activity data in response to an activity of the general user, and the user activity data is transmitted to the data provided system 130 and recorded therein.

Here, in the case where the user activity data is transmitted through the data processing apparatus 120, at least a part of the user activity data can be replaced with the pseudo activity data, if the general user so desires.

Figure 4:
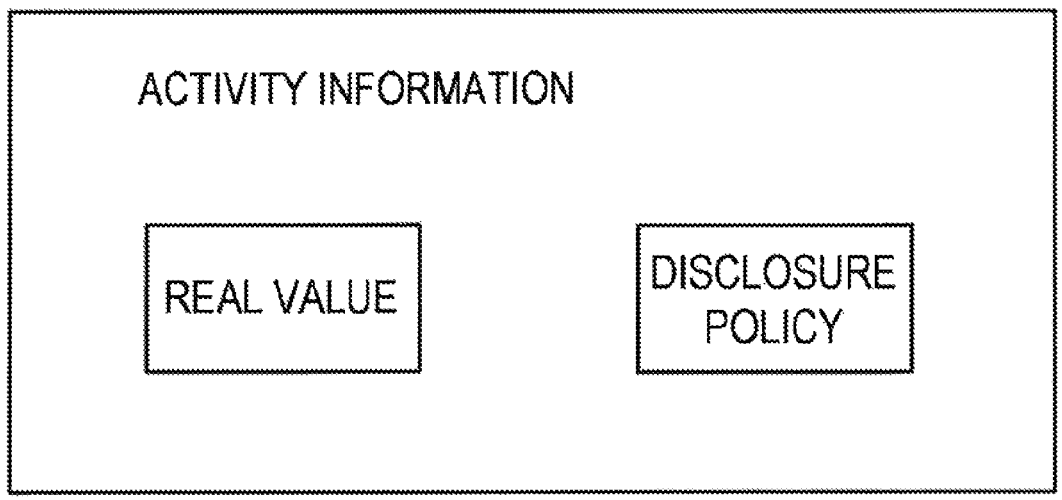
FIG. 4 is a schematic diagram illustrating a data structure of user activity data.

In this case, the general user manually operates the user terminal equipment 110 to input an instruction to keep the user activity data confidential, if desired. Then the user disclosure policy corresponding to the input as illustrated in FIG. 4 is transmitted from the user terminal equipment 110 to the data processing apparatus 120, together with the user activity data.

Figure 6:
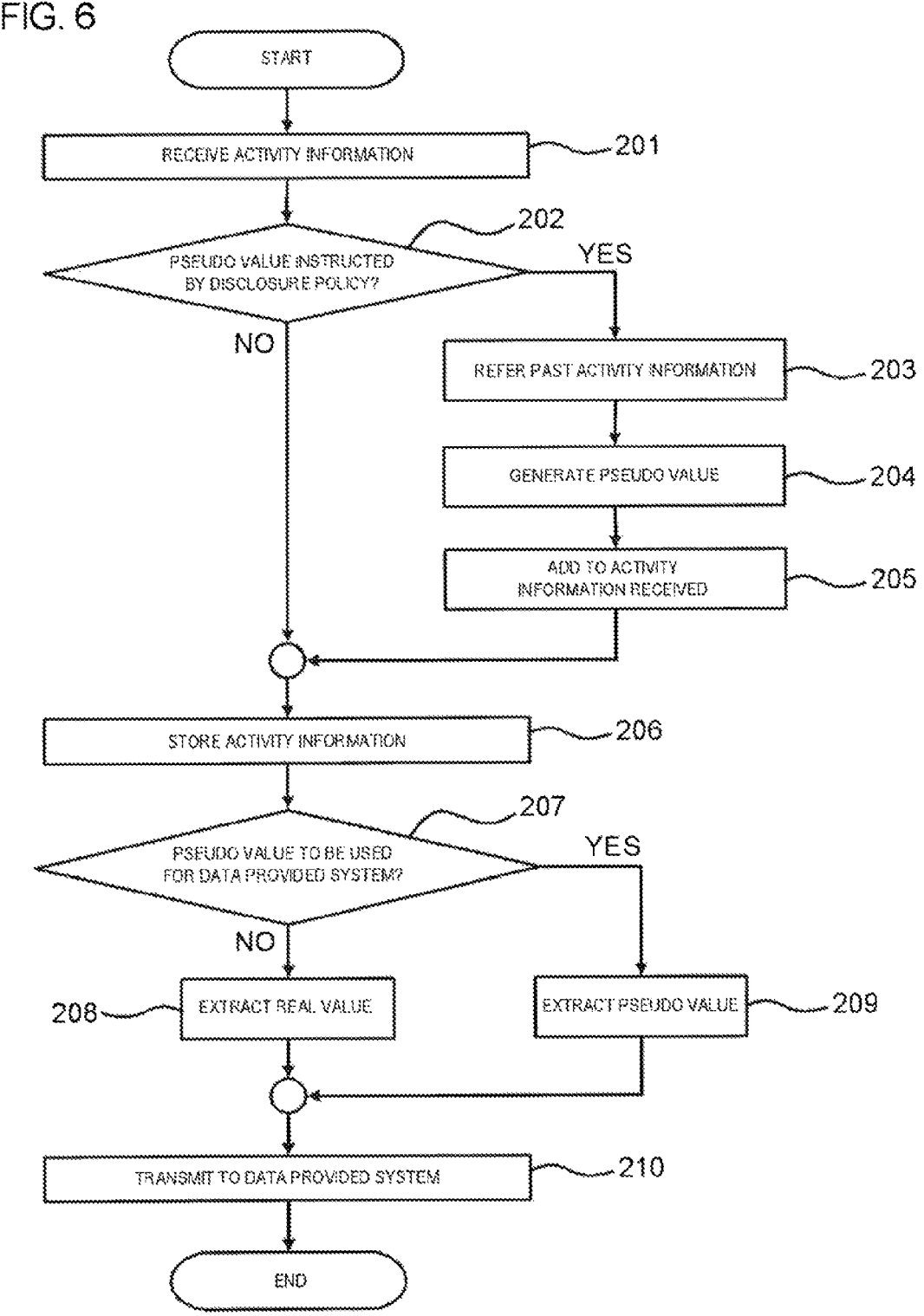
FIG. 6 is a flowchart illustrating an operation process of a data processing apparatus in the data processing system.

In the data processing apparatus 120, as illustrated in FIG. 6, the pseudo data generation device 122 receives the user activity data from the user terminal equipment 110, through the data reception device 121 (step 201).

The pseudo data generation device 122 looks up the past user activity data in the case where the user disclosure policy indicates that a real value is not to be delivered (step 202—Y), to thereby generate the pseudo activity data (steps 203 to 204), and adds the pseudo activity data to the user activity data (step 205).

Figure 5:
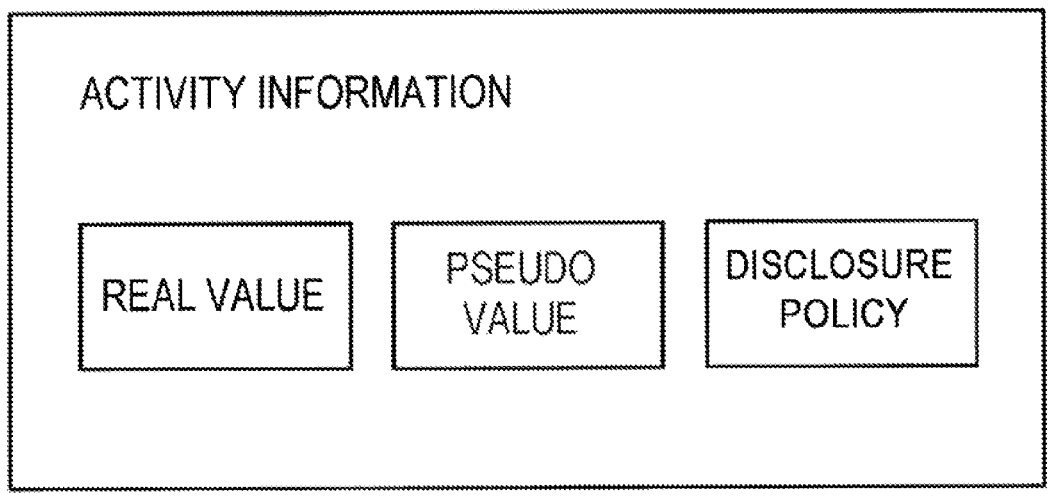
FIG. 5 is a schematic diagram illustrating a structure of user activity data including pseudo activity data.

At this stage, the user activity data includes, as illustrated in FIG. 5, a set of the real value representing the real user activity data, a pseudo value representing the pseudo activity data, and the user disclosure policy.

In the case where the user disclosure policy indicates that the real value is to be delivered (step 202—N), the process of the steps 203 to 205 is not executed. The user activity data is stored in the database device 123, irrespective of the instruction to keep a secret (step 206).

Then when the user activity data is to be delivered to the data provided system 130, the pseudo value is extracted from the user activity data (step 209), in the case where the data provided system 130 is a target to be provided with the pseudo value in the user disclosure policy (step 207—Y).

In the case where that is not target to be provided with the pseudo value (step 207—N), the real value is extracted (step 208). Finally the extracted data is transmitted to the data provided system 130 (step 210).

Thus, in the data processing system 100 according to this exemplary embodiment, the data generation unit 111 generates, as in the conventional system, the user activity data to be provided to the predetermined data provided system 130 reflecting the current status of the general user, and the data reception device 121 acquires the generated current user activity data. The database device 123 stores the acquired user activity data, and the data transmission device 124 provides the stored current user activity data, to the data provided system 130.

However, unlike the conventional system, the condition judging unit 125 judges whether to keep the to-be-provided current user activity data confidential, in accordance with a predetermined condition. Then the pseudo data generation device 122 generates, in the case where the current user activity data is judged to be kept confidential, the pseudo activity data different from but no contradictory with the current user activity data to be stored, on the basis of the stored past user activity data. The data hiding unit 126 adds the generated pseudo activity data, to the current user activity data to be stored.

Accordingly, the current user activity data of the general user to be provided to the data provided system 130 is partially replaced with the pseudo activity data by, for example, the instruction of the general user or automatic judgment of the system.

Hence, the user activity data of the general user can be kept confidential if needed, therefore, the general user's privacy can be protected. In particular, since the pseudo activity data for keeping the user activity data confidential is generated from the stored past user activity data, it may prevent the user activity data from being kept confidential by unnatural pseudo activity data, and it may prevent from doubts.

Also, in the case where the general user inputs in the user terminal equipment 110, when generating the user activity data, the user disclosure policy instructing to keep the user activity data confidential, the data processing apparatus 120 acquires the designated user disclosure policy together with the user activity data, and judges whether to keep current user activity data confidential in accordance with the acquired user disclosure policy. Therefore; the user activity data can be simply and securely kept confidential at a desired timing of the general user.

Further, the data processing apparatus 120 selects one similar to the current user activity data out of the plurality of stored past user activity data, to thereby generate the pseudo activity data. Accordingly, the user activity data can be sophisticatedly kept confidential through a simple operation.

Figure 7:
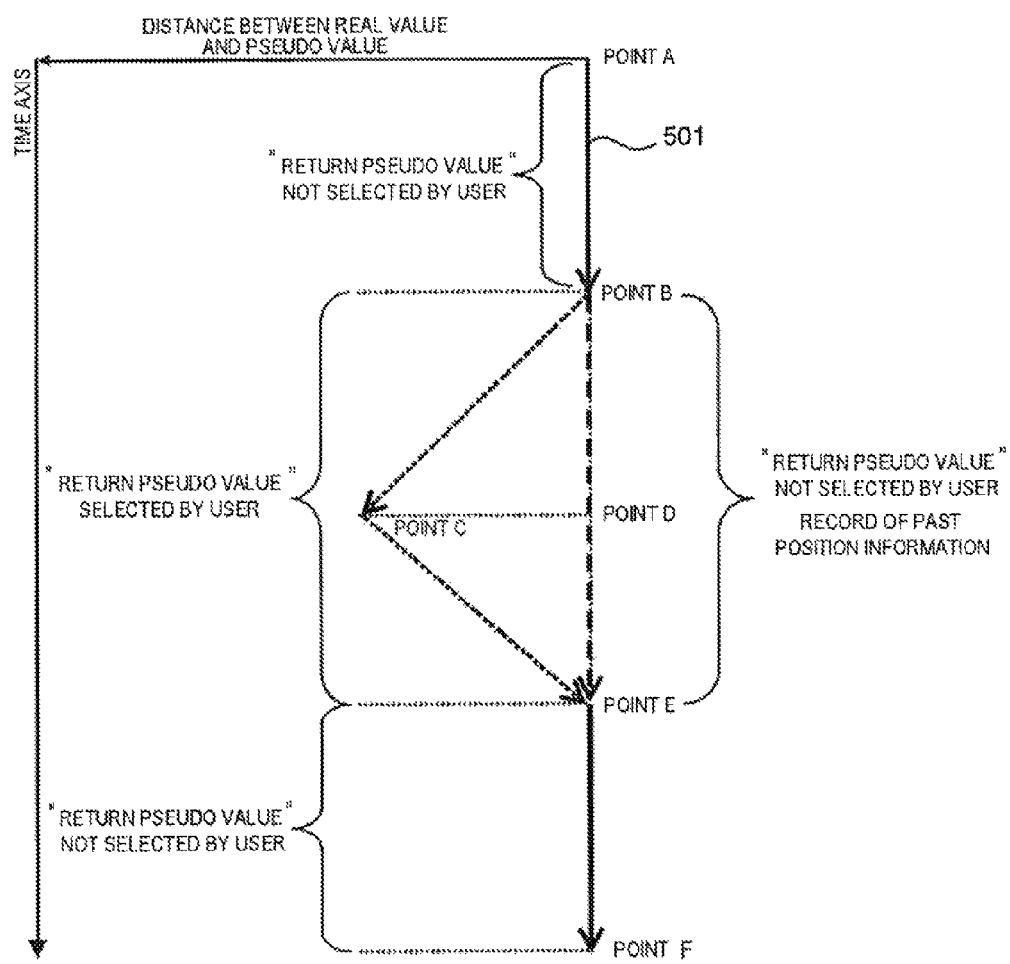
FIG. 7 is a schematic diagram illustrating an actual example of an activity of a general user.

Referring now to FIGS. 7 through 16, the foregoing operation of the data processing apparatus 120 will be described in details hereunder. Referring first to FIGS. 7 and 8, a first specific example of a generation process of the pseudo value will be described.

In this example, it will be assumed that the user activity data of the general user stored in the database device 123 includes one corresponding to a route of B-D-E in which "returning the pseudo value" is not selected. In the case where the general user instructs to "return the pseudo value" with respect to a section B-E when moving along a route of A-B-C-E-F, a record of B-D-E in past position information is generated as the pseudo value.

Figure 9:
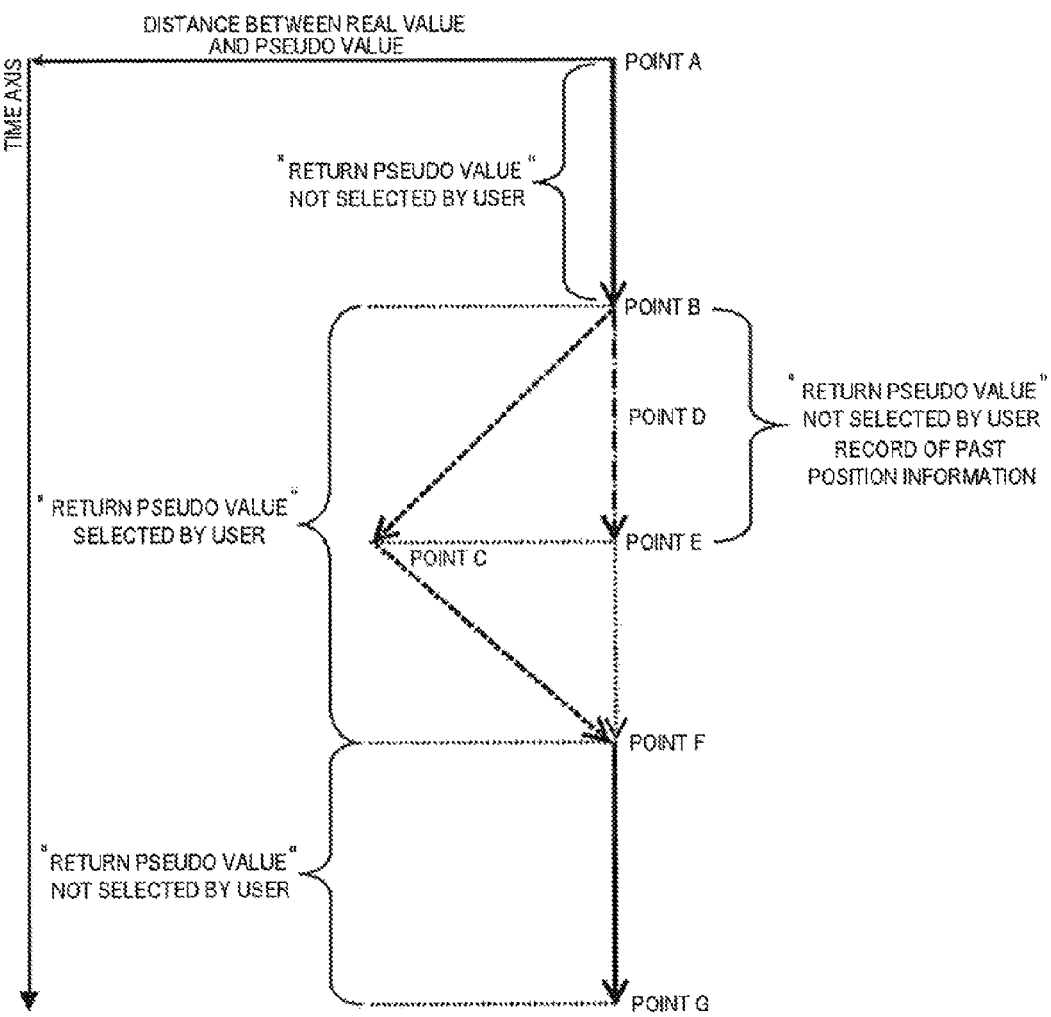
FIG. 9 is schematic diagram illustrating an example of an activity of the general user.
Figure 11:
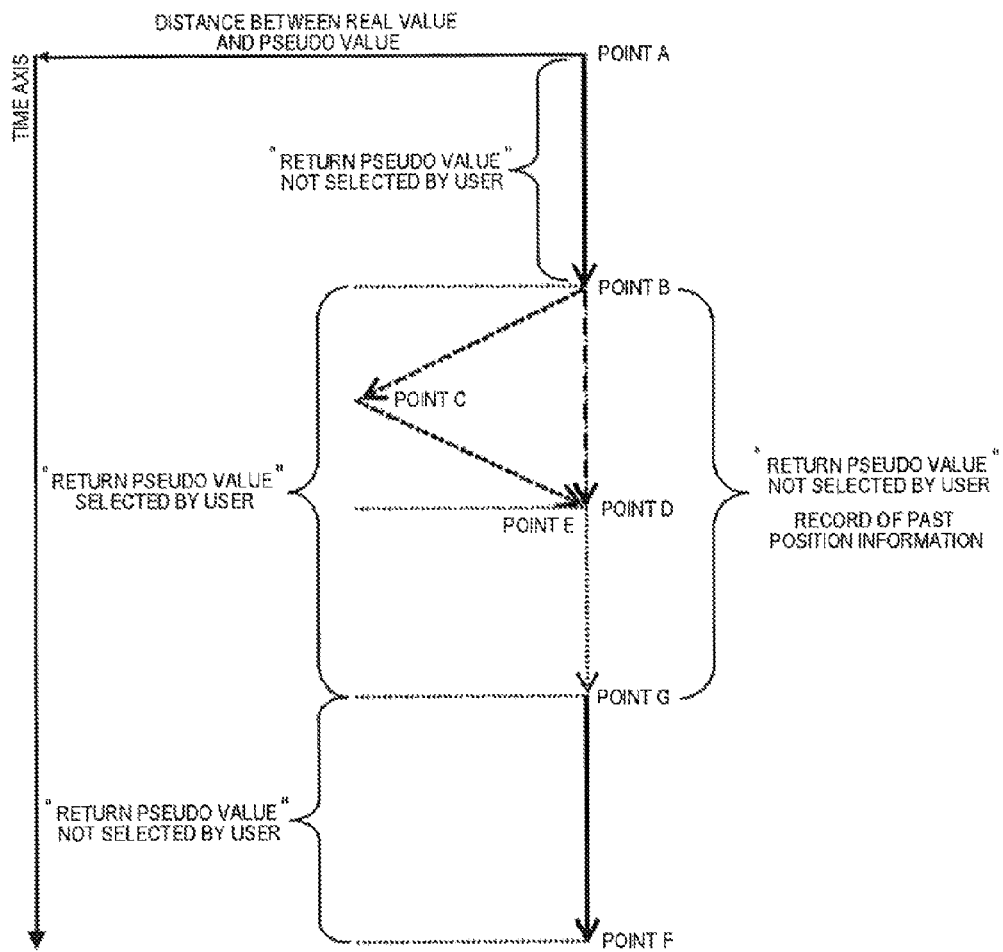
FIG. 11 is a schematic diagram illustrating an actual example of an activity of the general user.

In the case where the past user activity data is unavailable before the general user arrives at the point E as illustrated in FIGS. 9 and 10, the pseudo value is defined as Null. Conversely, in the case where the general user has already arrived at the point E at a timing that the general user arrived at the point D in the past user activity data, as illustrated in FIGS. 11 and 12, the pseudo value is defined as Null for a certain period of time corresponding to the distance between the points D and E, so that it does not appear as if the general user had instantly moved from the point D to the point E. The use of the pseudo value is cancelled at the time that the position corresponding to the real value (point G) is caught up.

Figure 13:
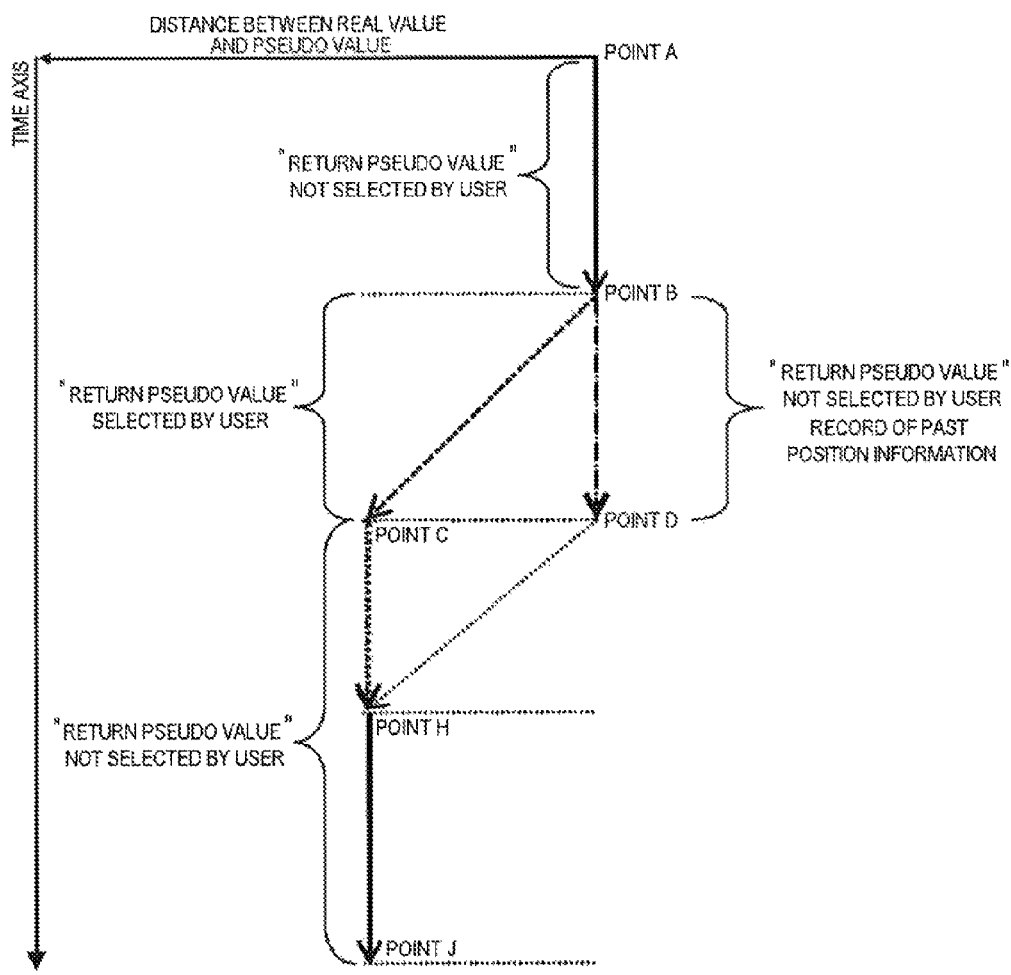
FIG. 13 is a schematic diagram illustrating an actual example of an activity of the general user.

In the case where the general user cancels the instruction to "return the pseudo value" at points other than point C (point C in FIGS. 11 and 12) as illustrated in FIGS. 13 and 14, the pseudo value is defined as Null for a certain period of time corresponding to the distance between the current position of the user activity data represented by the pseudo value and the current position of the general user, so that it does not appear as if the general user had instantly moved from the point D to the point H.

Alternatively, instead that the general user expressly instructs to "return the pseudo value" at the step 202, the pseudo data generation device 122 may automatically instruct to "return the pseudo value" in the case where the pseudo data generation device 122 receives position information deviated from the past position information, and contain to process until the position information matches the past position information.

Figure 15:
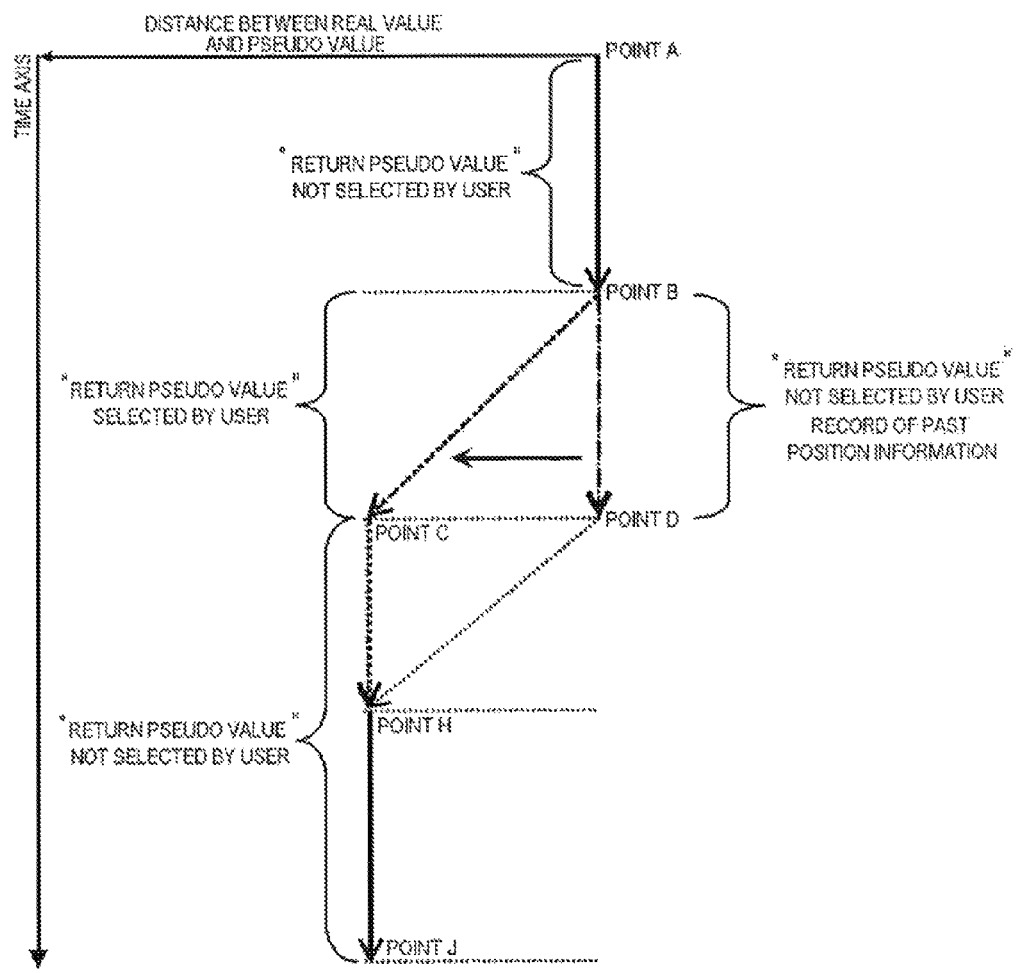
FIG. 15 is a schematic diagram illustrating an actual example of an activity of the general user.

In the case where the general user retroactively cancels the instruction to "return the pseudo value" after the automatic setting thereof is performed, the pseudo value corresponding to the section B-D is modified to a value corresponding to the section B-C, as illustrated in FIGS. 15 and 16.

Figure 17:
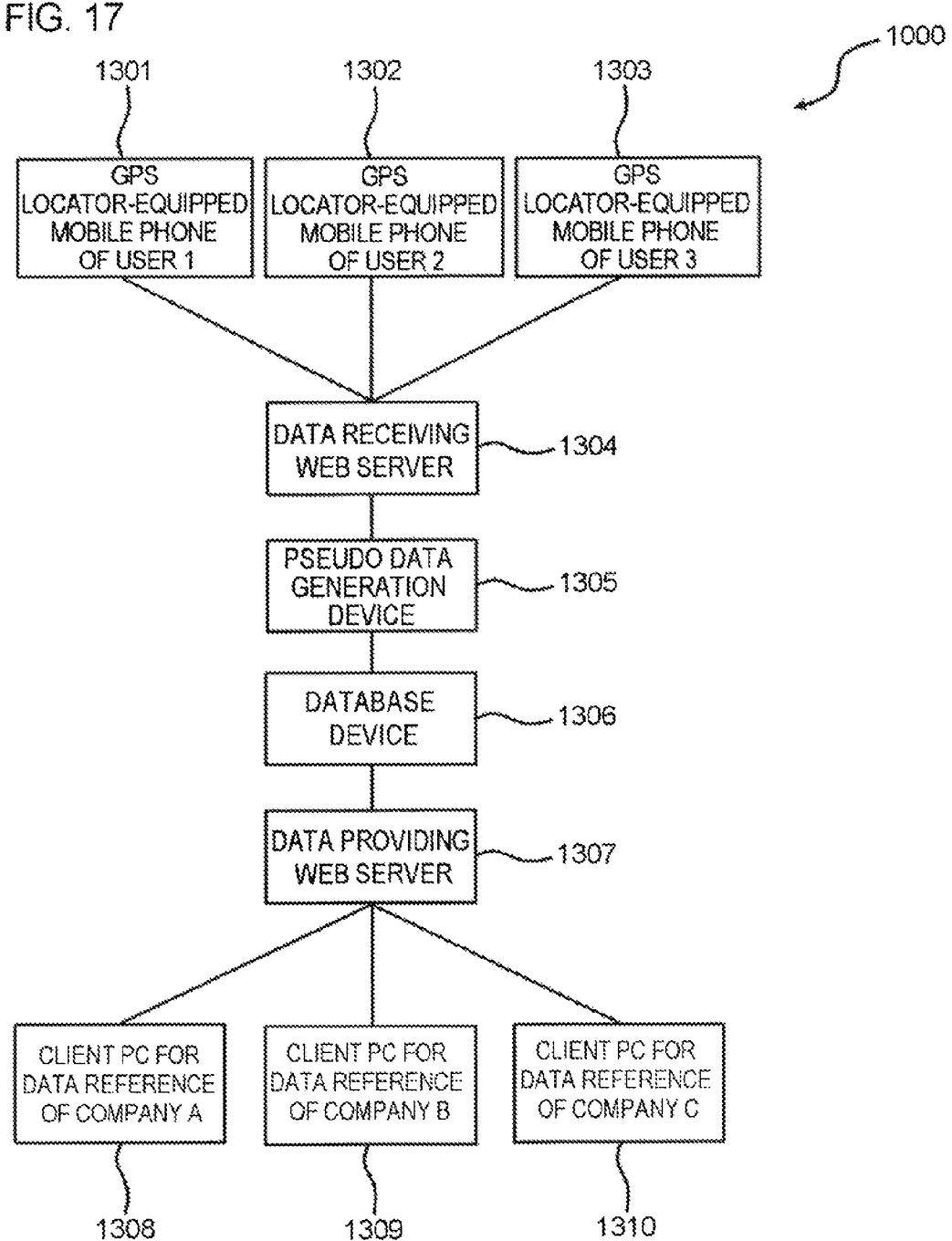
FIG. 17 is a block diagram illustrating a specific example of the data processing system.

Now, a specific example of utilization of the data processing system 100 configured as above will be described hereunder, referring to FIGS. 17 to 19. Referring to the example illustrated in FIG. 17, a data receiving web server 1304 receives position information of a plurality of general users 1, 2, and 3 from GPS locator-equipped mobile phones 1301, 1302, and 1303.

A data providing web server 1307 provides the position information of the general users to client PCs 1308, 1309, and 1310 of companies A, B, and C as the data provided system 130.

Figure 18:
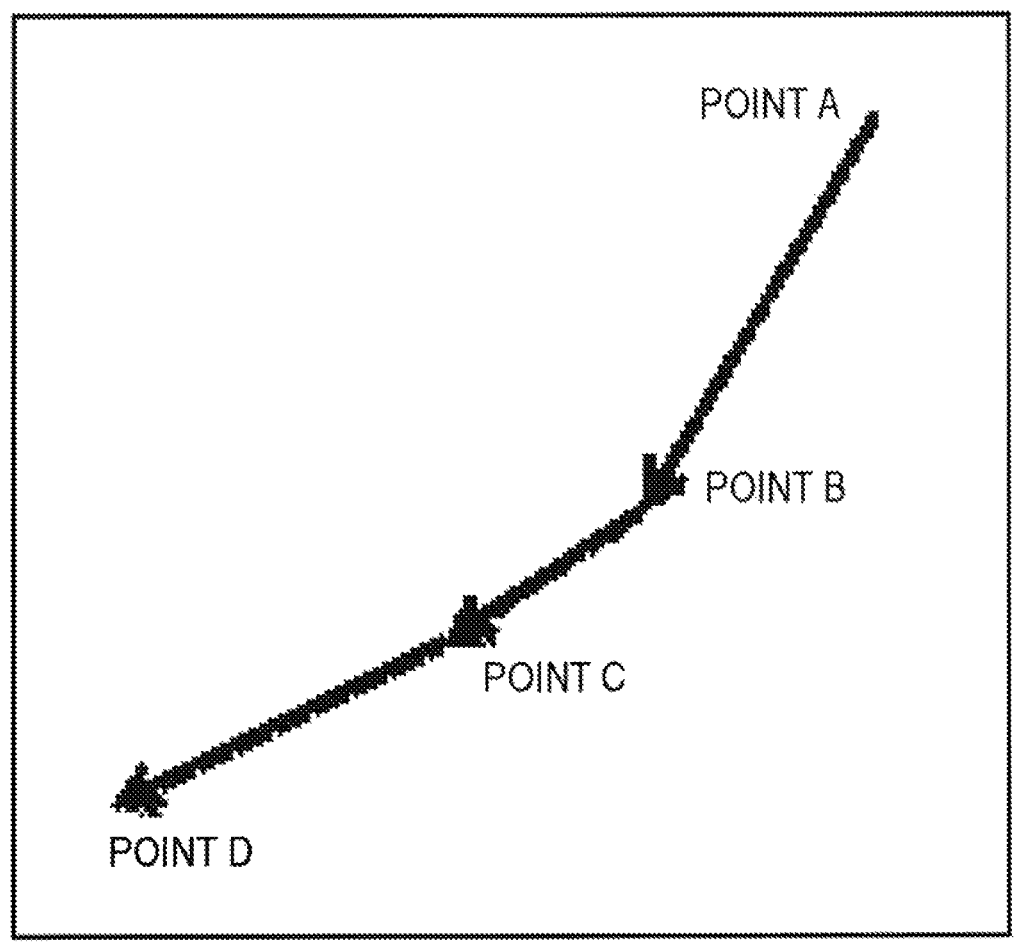
FIG. 18 is a schematic diagram illustrating an actual example of an activity of the general user.

It will be assumed that a daily activity of the general user 1 is expressed in two-dimensional position information as illustrated in FIG. 18, and that the use of the pseudo value is not designated in the position information. It will also be assumed that the general user 1 sets in the terminal the user disclosure policy of providing the real value to the company A, and providing the pseudo value to the companies B and C.

Figure 19:
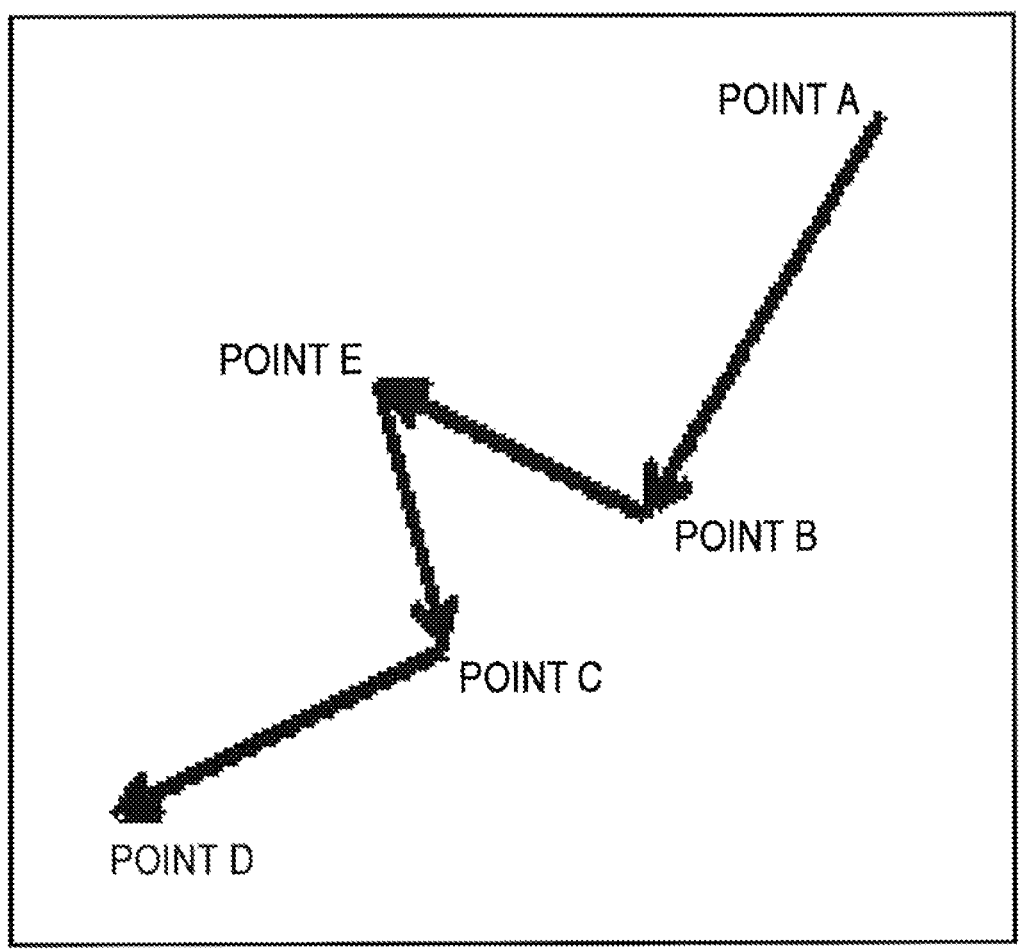
FIG. 19 is a schematic diagram illustrating an actual example of an activity of the general user.

In the case where one day the general user 1 takes the action illustrated in FIG. 19 unlike the daily activity, the client of the company A can acquire the same position information as FIG. 19, while the clients of the companies B and C receive the position information illustrated in FIG. 18, as the pseudo value. Thus, the general user 1 can keep his/her action different from his/her daily activity confidential, to the companies B and C.

It is to be noted that the present invention is in no way limited to this exemplary embodiment, but encompasses various modifications within the scope of the present invention. For example, according to the foregoing exemplary embodiment, the hiding instruction unit 112 is implemented in the user terminal equipment 110, so that the general user can instruct to keep the user activity data confidential, if desired.

Under such setting, however, in the case where the general user forgets to instruct when the user activity data has to be kept confidential, the user activity data not kept confidential is recorded in the data provided system 130. Accordingly, generation of the pseudo value may be automatically started in the case where the real value is deviated from the past user activity data that frequently appears (not illustrated).

In this case, the exemplary embodiment may be arranged such that the database device 123 stores a plurality of user activity data at least a part of which is constituted of the same Pattern; the data reception device 121 acquires the current user activity data only partly different from the user activity data of the same pattern; the condition judging unit 125 judges to keep a part of the current user activity data different from the user activity data of the same pattern confidential; and the pseudo data generation device 122 generates, as the pseudo activity data, the part of the user activity data of the same pattern different from the acquired current user activity data.

In the case where the general user cancels the generation of the pseudo value in the foregoing situation, it is preferable to set a buffer time, or modify to the real value the pseudo value history from the time that the automatic generation of the pseudo value was started to the time that the pseudo value generation is cancelled, so as to prevent an abrupt change of the apparent moving speed.

Also, under the setting of the automatic generation of the pseudo value as described above, the automatic generation may be suspended in advance, if need be. In this case also, the general user designates, at the time that the user activity data is generated, the user disclosure policy instructing whether to keeping a secret, in the user terminal equipment 110.

The data processing apparatus 120 may be set up so as to acquire the designated user disclosure policy together with the user activity data, and to stop the generation of the pseudo activity data in the case where the acquired user disclosure policy indicates no need to keep a secret, and the data transmission device 124 may stop transmission of the pseudo activity data and transmit the current user activity data.

It is not mandatory to set a plurality of user activity data serving as reference with respect to one pseudo activity data as above, but a single piece of user activity data may be designated as the reference (not illustrated). In this case, the exemplary embodiment may be arranged such that the data reception device 121 acquires the current user activity data only partly different from the stored user activity data; the condition judging unit 125 judges to keep a secret in the case where the acquired current user activity data is only partly different from the stored user activity data; and the pseudo data generation device 122 generates, as the pseudo activity data, the different part of the stored user activity data from the acquired user activity data.

Also, the foregoing exemplary embodiment exemplifies the case that the data processing apparatus 120 selects one similar to the current user activity data, out of a plurality of stored past user activity data, and generates the pseudo activity data.

Instead, the data processing apparatus 120 may extract a plurality of data similar to the current user activity data out of the plurality of stored user activity data, and provide the general user with the plurality of extracted similar user activity data for selection, to thereby generate the pseudo activity data from the one selected by the general user (not illustrated).

Figure 20:
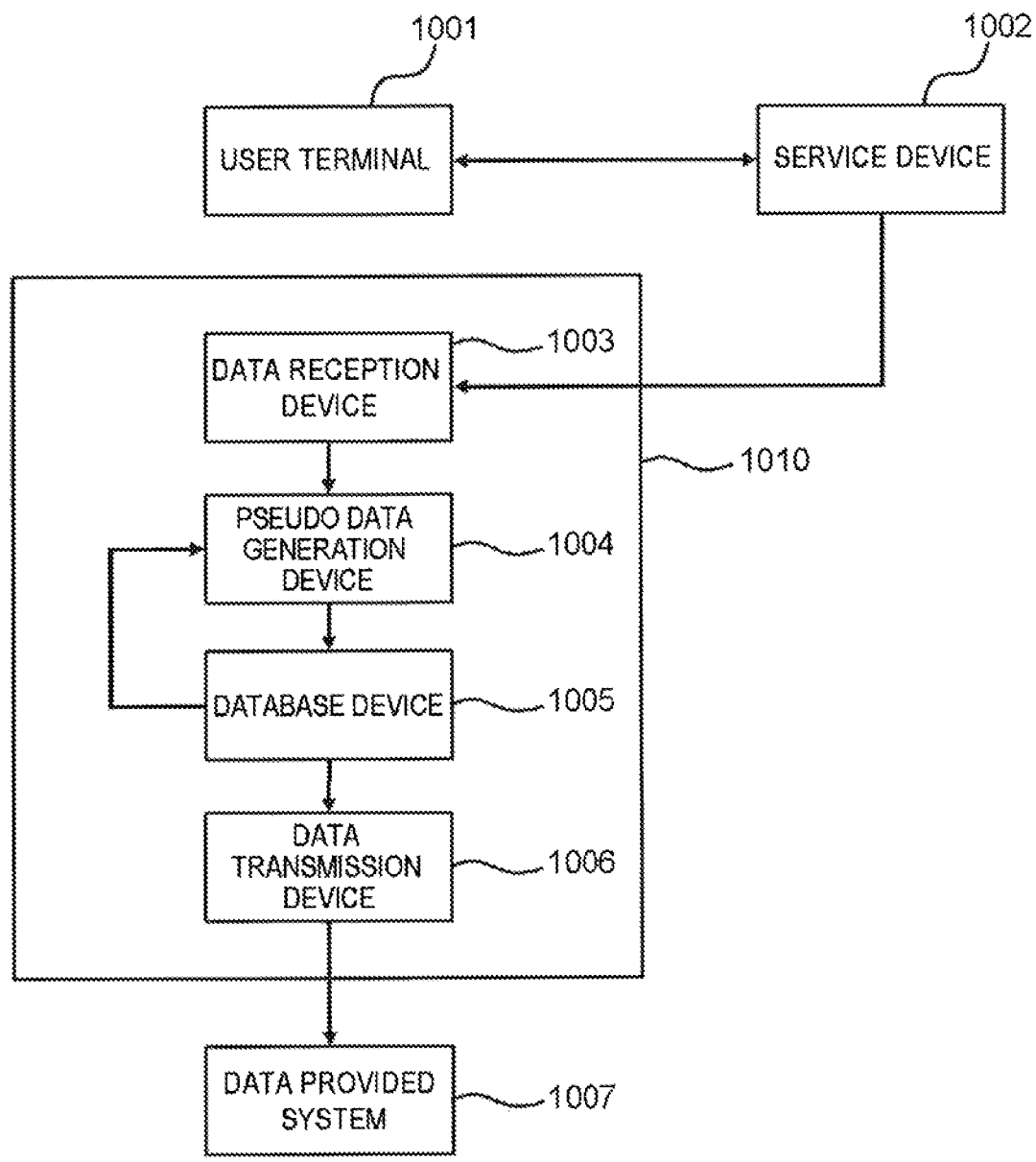
FIG. 20 is a block diagram illustrating a configuration of the data processing system in a modified example.

Also, the foregoing exemplary embodiment exemplifies the case that the user terminal equipment 110 directly provides the user activity data and the disclosure policy to the data processing apparatus 120. However, as illustrated in FIG. 20, a service device 1002 that has made communication with a user terminal equipment 1001 may transmit the user activity data of the general user to a data reception unit 1003 of a data processing apparatus 1010.

Such an arrangement may be adopted in the case where the user terminal equipment 1001 is unable to directly communicate with the data reception unit 1003, and where the service device 1002 is capable of generating more detailed user activity data, such as payment information.

Figure 21:
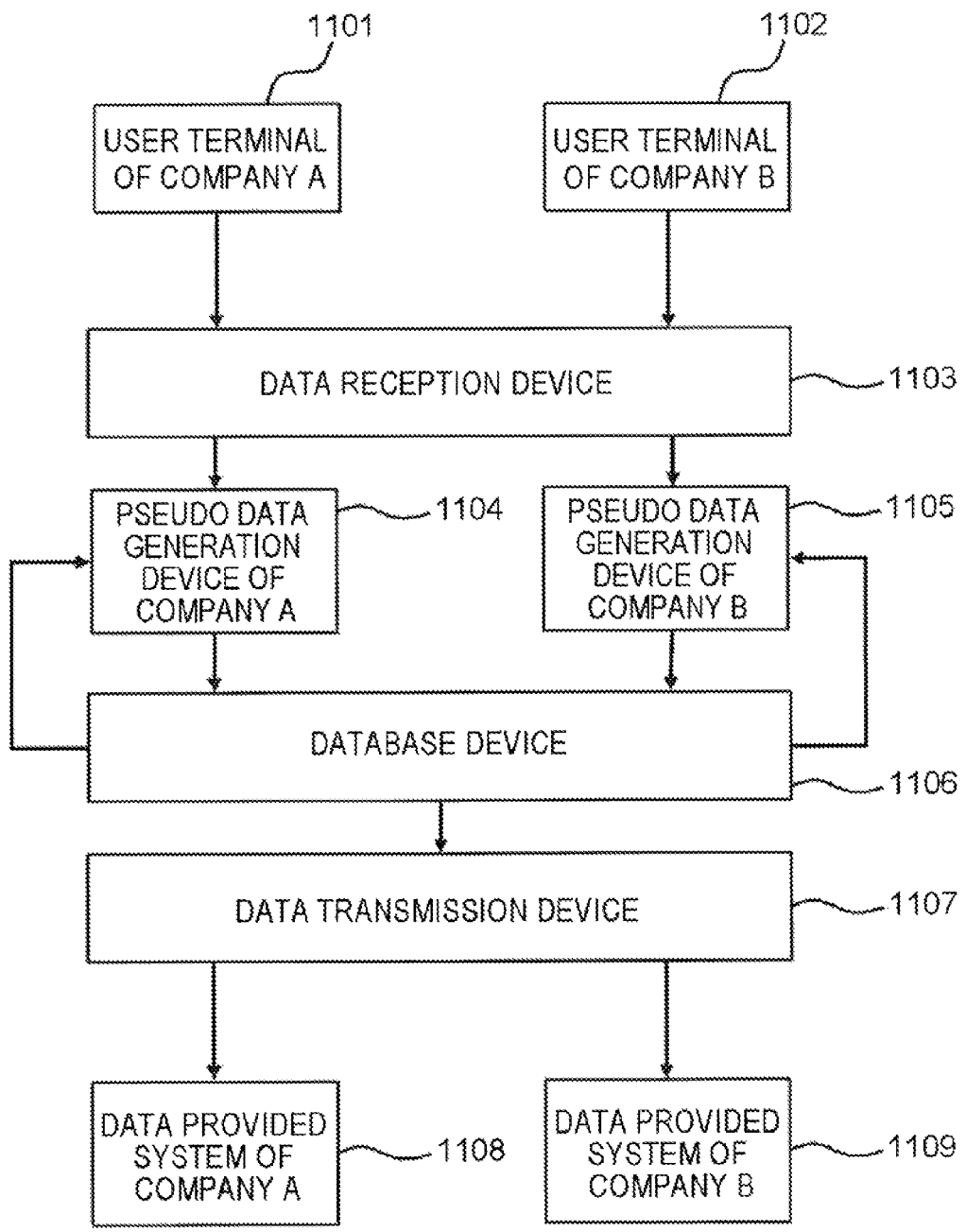
FIG. 21 is a block diagram illustrating a modified configuration of the data processing system in another modified example.

Although the foregoing exemplary embodiment is based on the assumption that a plurality of user terminal equipments 110 is utilizing a common mobile phone service, the system may include a user terminal equipment 1101 of a company A and a user terminal equipment 1102 of a company B as the user terminal equipment, a pseudo data generation unit 1104 of the company A and a pseudo data generation unit 1105 of the company B as the pseudo data generation unit, and a data provided system 1108 of the company A and a data provided system 1109 of the company B as the data provided system, as illustrated in FIG. 21.

In the case of thus sharing the data reception device, the database device, and the data transmission device, a plurality of pseudo activity data generation services can be executed, as long as the plural pseudo data generation units are provided for.

The plurality of pseudo activity data generation services can also be executed in the case where the system includes a plurality of database devices, data reception devices, or data transmission devices, and single user terminal equipment or a single data service system.

Further, the foregoing exemplary embodiment exemplifies the case where the data processing apparatus 120 intermediating between the user terminal equipment 110 and the data provided system 130 serves to keep the user activity data confidential. However, the function of keeping the user activity data confidential may be implemented in the user terminal equipment.

Figure 22:
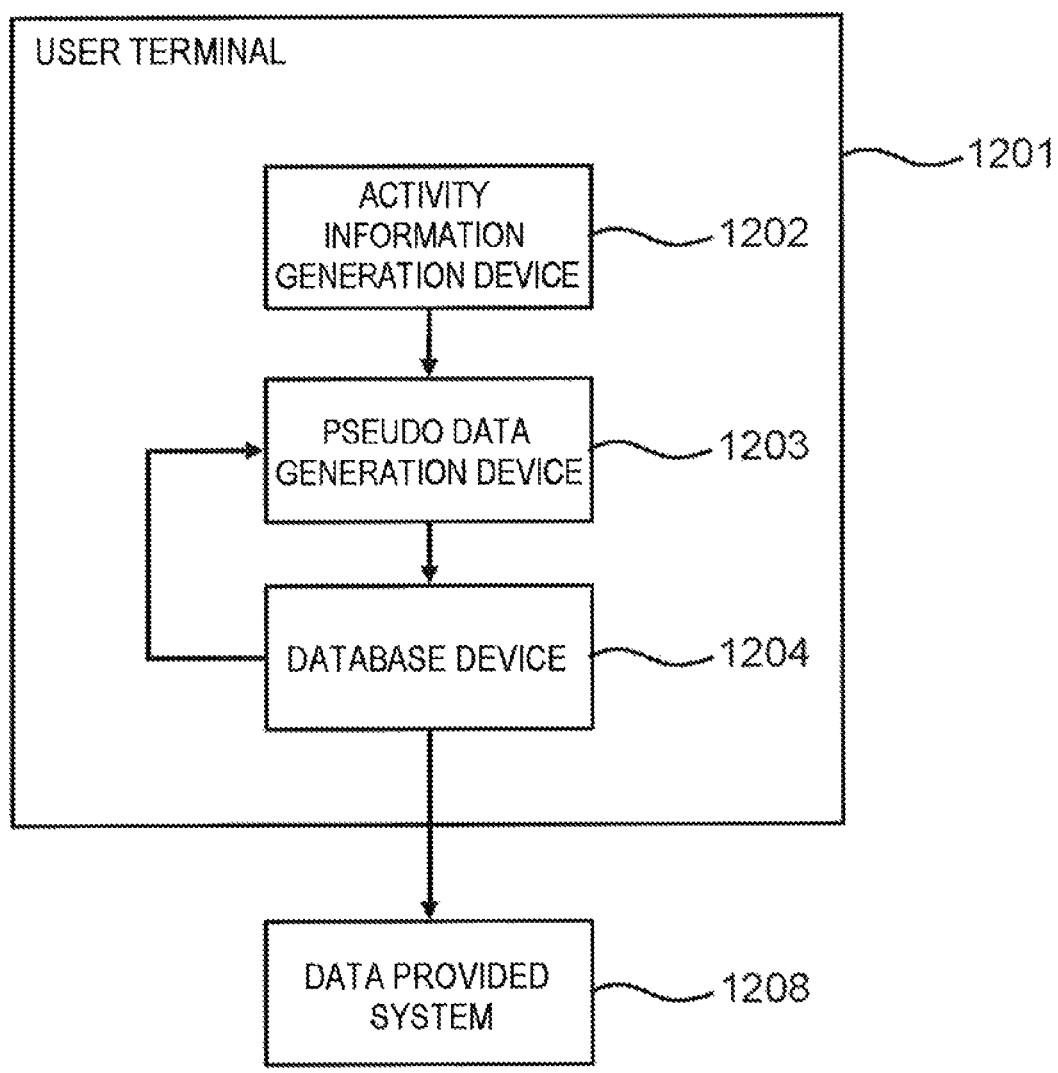
FIG. 22 is a block diagram illustrating a modified configuration of the data processing system in a still another modified example.

For example, as illustrated in FIG. 22, a user terminal equipment 1201 may include an activity data generation device 1202, a pseudo data generation device 1203, and a database device 1204.

In this case the pseudo activity data is generated in the user terminal equipment 1201, and the current user activity data, or the user activity data kept confidential by the pseudo activity data if necessary, is provided to the data provided system 1208, as illustrated in FIG. 4 or 5.

Such an arrangement prevents the user activity data not kept confidential from being provided to the data service system 1208, thereby minimizing risk of leakage of privacy through unauthorized access and the like.

Further, the foregoing exemplary embodiment exemplifies the case where the user activity data kept confidential by the pseudo activity data is provided to the data provided system 130 with the user disclosure policy contained, as illustrated in FIG. 5.

However, in this case analyzing the user disclosure policy of the user activity data may lead to turning out to keep a secret. Accordingly, upon generating the pseudo activity data in accordance with the user disclosure policy thereby keeping the user activity data confidential as above, the user disclosure policy may be deleted from the user activity data before providing the user activity data to the data provided system 130 (not illustrated).

Still further, the foregoing exemplary embodiment is based on the assumption that the user terminal equipment 110 is what is known as the GPS mobile phone, and the user activity data is the movement track data. However, the data processing system according to the present invention may include, for example, a user terminal equipment that generates the user activity data incorporating a GPS, a browser, or an electronic money client, a user activity data reception device that receives the user activity data from the user terminal equipment, a database device that records each value of the user activity data, a pseudo data generation device that generates pseudo information, and a data transmission device that accepts a request from the provided system (not illustrated).

In this case, the user activity data may include position information, purchase information, web view history, and so forth. Also, each value of the data may include information on time of the day at which the activity has been performed. Even in the case where the time of the day is not included, the data may be assorted in the order that the activities have been performed, so that a timewise sequence of the activities can be identified.

In the case where the general user actually utilizes the data processing system 100 described above, a history of the past user activity data performed between the current position and a position where the general user stayed for a long time (approx. six hours or more) may be displayed in the order of frequency of the activity pattern as candidates of the pseudo value to make the general user select.

Generally, it is preferable that a history of commuting routes between home and the workplace is displayed in some patterns to select one among the patterns for using as the pseudo value. After the pattern is selected, the past history of that pattern is utilized as the pseudo value.

In the case where a certain period of time has elapsed after the real value reached substantially the same status as the pseudo value, the setting for generating the pseudo value may be cancelled. Generally, it is preferable to cancel the setting of the pseudo value at home or the workplace because the real value and the pseudo value match each other.

In the case where the history of the pseudo value has become unavailable, it is preferable to return "Null". In the case where general user cancels the setting for generating the pseudo value at a stage where the real value is deviated from the pseudo value, it is preferable to set the pseudo value as "Null" for a certain period of time corresponding to the distance between the real value and the pseudo value, instead of instantly make the pseudo value equal to the real value, so as to prevent an abrupt change of the apparent moving speed.

The foregoing exemplary embodiment exemplifies that the respective units of the data processing apparatus can be logically realized as the corresponding functions by the computer program. However, each of those units may be provided in a form of exclusive hardware, and realized as a combination of software and the hardware.

Naturally, the foregoing exemplary embodiment and the plurality of modifications may be combined as long as contradiction is not created. Further, although the foregoing exemplary embodiment and the modifications refer to specific structures of the units, such structures may be modified in various manners within the scope of the present invention.

This application is the National Phase of PCT/JP2009/005690, filed Oct. 28, 2009, which claims priority based on Japanese patent application No. 2008-280749 filed on Oct. 31, 2008, the entire disclosure of which is incorporated hereinto by reference.

The invention claimed is:

1. A data processing system, comprising:
   a data generation unit that generates user activity data to be provided to a predetermined data service system, reflecting a current status of a general user;
   a data acquisition unit that acquires the generated current user activity data;
   a data storage unit that stores the acquired current user activity data;
   a data provision unit that provides the stored current user activity data to said data service system;
   a condition judging unit that judges whether to keep the to-be-provided current user activity data confidential, in accordance with a predetermined condition;
   a pseudo data generation unit that selects past user activity data similar to the current user activity data out of a plurality of stored past user activity data and generates, in the case where the current user activity data is judged to be kept confidential, pseudo activity data different from the current user activity data to be stored, on the basis of the selected past user activity data; and
   a data hiding unit that adds the generated pseudo activity data to the current user activity data to be stored.

2. The data processing system according to claim 1,
   wherein said data acquisition unit acquires the current user activity data only partly different from the stored past user activity data;
   said condition judging unit automatically judges to keep a secret without a user instruction in the case where the acquired current user activity data is only partly different from the stored past user activity data; and
   said pseudo data generation unit generates the pseudo activity data from a part of the stored past user activity data different from the acquired current user activity data.

3. The data processing system according to claim 1,
   wherein in said data storage unit, at least a part of the plurality of stored past user activity data is constituted of the same pattern;
   said data acquisition unit acquires the current user activity data only partly different from the stored past user activity data of the same pattern;
   said condition judging unit automatically judges to keep a part of the current user activity data different from the stored past user activity data of the same pattern confidential without a user instruction; and
   said pseudo data generation unit generates, as the pseudo activity data, the part of the stored past user activity data of the same pattern different from the acquired current user activity data.

4. The data processing system according to claim 1, further comprising:
   a hiding instruction unit that allows the general user to designate a user disclosure policy that instructs whether to keep the user activity data confidential, when the user activity data is generated;
   wherein said data acquisition unit acquires the designated user disclosure policy together with the user activity data;
   said pseudo data generation unit stops generation of the pseudo activity data in the case where the acquired user disclosure policy instructs not to keep a secret; and
   said data provision unit stops transmission of the pseudo activity data and transmits the current user activity data.

5. The data processing system according to claim 1,
   wherein said data provision unit stops transmitting the pseudo activity data in the case where the pseudo activity data being transmitted at real time matches the current user activity data not being transmitted, and restarts transmitting the current user activity data.

6. The data processing system according to claim 1,
   wherein said condition judging unit causes the current user activity data to be provided to said data service system, in the case where past user activity data that allows the pseudo activity data to be generated cannot be retrieved.

7. A data processing apparatus to be used in said data processing system according to claim 1 together with said data generation unit and said data service system, comprising:
   said data acquisition unit;
   said data storage unit;
   said data provision unit;
   said condition judging unit;
   said pseudo data generation unit; and
   said data hiding unit.

8. A user terminal equipment to be used in said data processing system according to claim 1 together with said data service system, comprising:
   said data generation unit;
   said data acquisition unit;
   said data storage unit;
   said data provision unit;
   said condition judging unit;
   said pseudo data generation unit; and
   said data hiding unit.

9. The data processing system according to claim 1, further comprising:
   a hiding instruction unit that allows the general user to designate a user disclosure policy that instructs whether to keep the user activity data confidential, when the user activity data is generated;
   wherein said data acquisition unit acquires the designated user disclosure policy together with the user activity data; and
   said condition judging unit judges whether to keep the current user activity data confidential in accordance with the acquired user disclosure policy.

10. The data processing system according to claim 9,
wherein said pseudo data generation unit extracts plural past user activity data similar to the current user activity data out of the plurality of stored past user activity data; and
said pseudo data generation unit provides the extracted plural past user activity data to the general user for selection and generates the pseudo activity data based on the past user activity data selected by the general user.

11. A data processing method executed by a data processing apparatus, including:
acquiring current user activity data reflecting a current status of a general user;
storing the acquired current user activity data;
providing the stored current user activity data to a predetermined data service system;
judging whether to keep the to-be-provided current user activity data confidential, in accordance with a predetermined condition;
selecting past user activity data similar to the current user activity data out of a plurality of stored past user activity data;
generating, in the case where the current user activity data is judged to be kept confidential, pseudo activity data different from the current user activity data to be stored, on the basis of the selected past user activity data; and
adding the generated pseudo activity data to the current user activity data to be stored.

12. A data processing method executed by a user terminal equipment, including:
generating user activity data to be provided to a predetermined data service system, reflecting a current status of a general user;
acquiring the generated current user activity data;
storing the acquired current user activity data;
providing the stored current user activity data to the predetermined data service system;
judging whether to keep the to-be-provided current user activity data confidential, in accordance with a predetermined condition;
selecting past user activity data similar to the current user activity data out of a plurality of stored past user activity data;
generating, in the case where the current user activity data is judged to be kept confidential, pseudo activity data different from the current user activity data to be stored, on the basis of the selected past user activity data; and
adding the generated pseudo activity data to the current user activity data to be stored.

13. A non-transitory computer-readable storage medium storing a program for causing a computer to execute the data processing method according to claim 11 or 12.

* * * * *